Aug. 19, 1930.  A. ATHERTON  1,773,336
CENTRAL BATTERY DUPLEX TELEGRAPH SYSTEM
Filed July 28, 1927   4 Sheets-Sheet 1

Inventor
Albert Atherton
By
Eugene C. Brown
Attorney

Aug. 19, 1930.  A. ATHERTON  1,773,336
CENTRAL BATTERY DUPLEX TELEGRAPH SYSTEM
Filed July 28, 1927  4 Sheets-Sheet 2

Inventor
Albert Atherton
By
Eugene C. Brown
Attorney

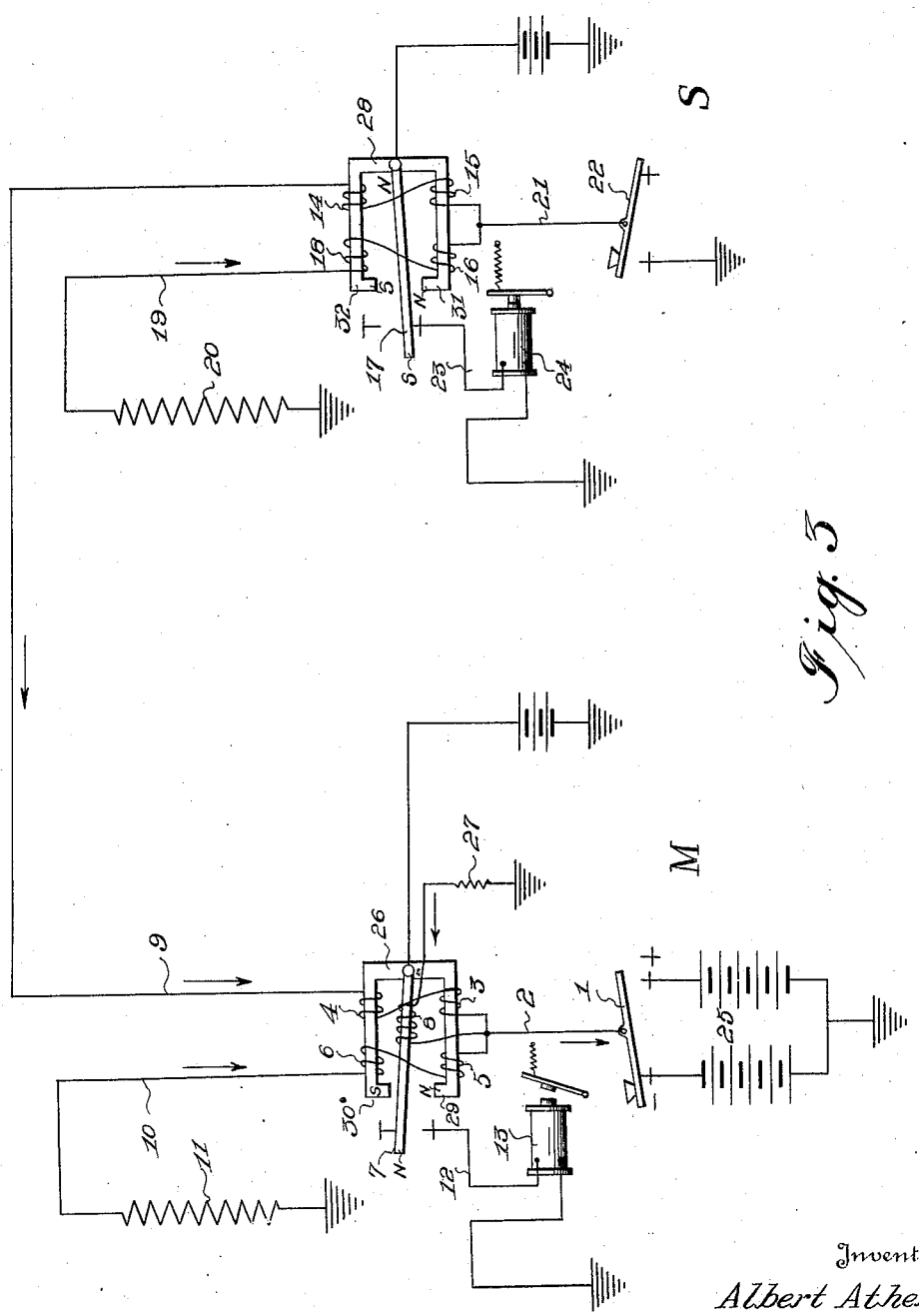

Aug. 19, 1930.   A. ATHERTON   1,773,336
CENTRAL BATTERY DUPLEX TELEGRAPH SYSTEM
Filed July 28, 1927   4 Sheets-Sheet 4
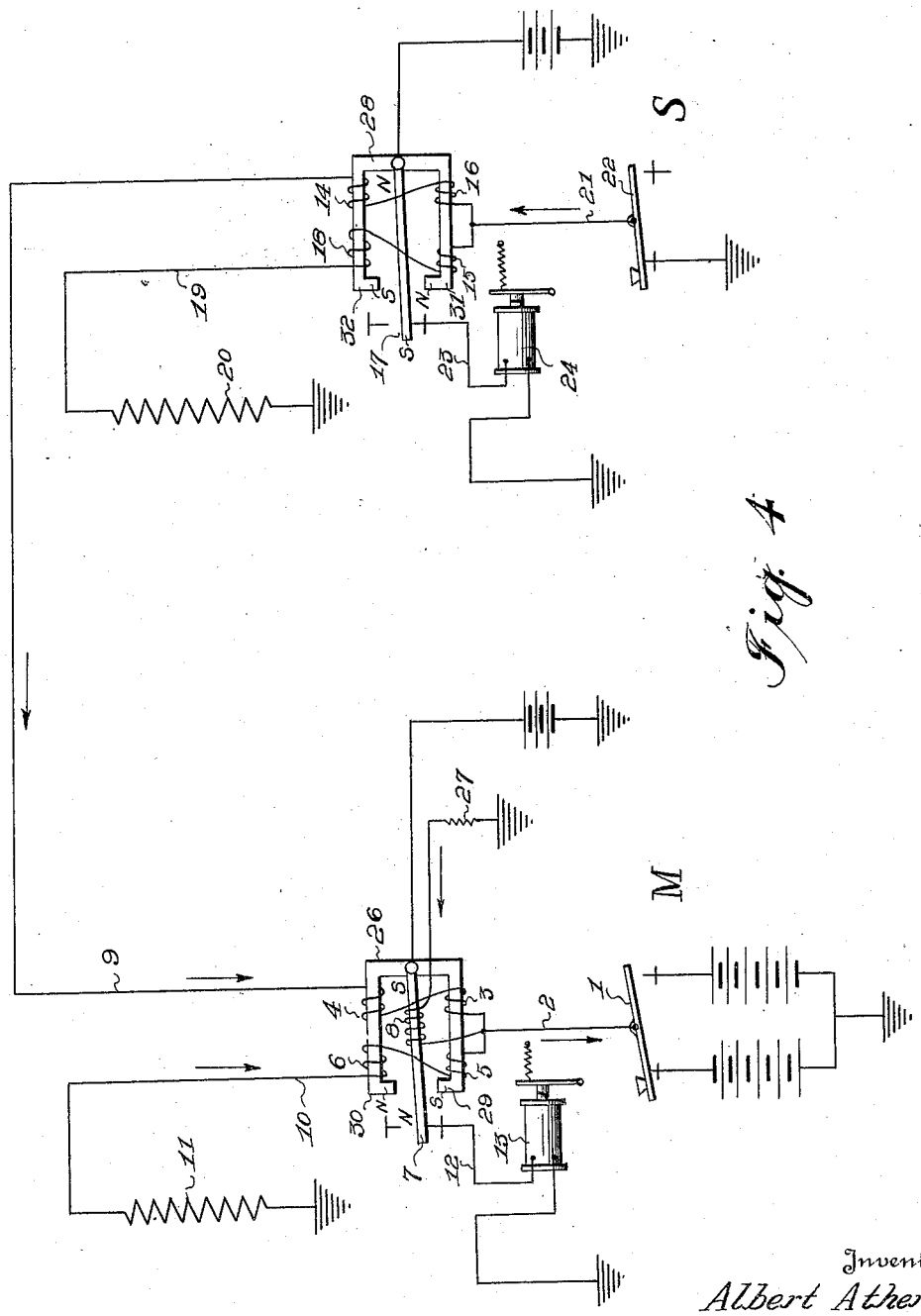
Inventor
Albert Atherton
By
Eugene C. Brown
Attorney Patented Aug. 19, 1930

1,773,336

UNITED STATES PATENT OFFICE

ALBERT ATHERTON, OF BLOOMFIELD, NEW JERSEY, ASSIGNOR TO THE WESTERN UNION TELEGRAPH COMPANY, OF NEW YORK, N. Y., A CORPORATION OF NEW YORK

CENTRAL-BATTERY DUPLEX TELEGRAPH SYSTEM

Application filed July 26, 1927. Serial No. 208,983.

My invention relates, in general, to signaling systems, and more particularly to the duplex type of telegraphy.

In telegraph systems connecting a main and a substation, such, for example, as a main city station and its outlying branch office, it is desirable to operate the system with a single source of energy located at the main station.

Heretofore such central battery duplex systems have employed at the battery station a relay of such character that it tended to repeat a spacing signal each time the transmitting device at that station was operated irrespective of whether the out station was sending a spacing or a marking signal at the time. A condition resulted thereby in which there was a continuous tendency for the signal received at the battery station to be mutilated or lost.

An object of my invention is to provide means for effectively operating a duplex telegraph system with batteries at only one station.

Another object of my invention is to provide means for operating polar relays in a duplex telegraph system with line batteries at only one station.

Another object of my invention is to provide means for preventing mutilation of signals in a duplex telegraph system.

Still another object of my invention is to provide means for operating a duplex system with an artificial line which only approximately balances the main line.

There are other objects of this invention which, together with the foregoing, will appear in the description which follows.

In practicing my invention, I provide a duplex telegraph system with sources of energy located at one station. An unbiased polar relay located thereat is unaffected by reversals of polarity from the source of energy but responds to changes of line current produced by the transmitter at the distant station. A polarized relay at the same remote station responds to the changes in polarity of the source of energy.

Fig. 1 showing the open key condition and Fig. 2 the closed key condition.

Figs. 3 and 4 are similar circuit diagrams showing the effects produced when the key at the main station is operated.

Figure 1:
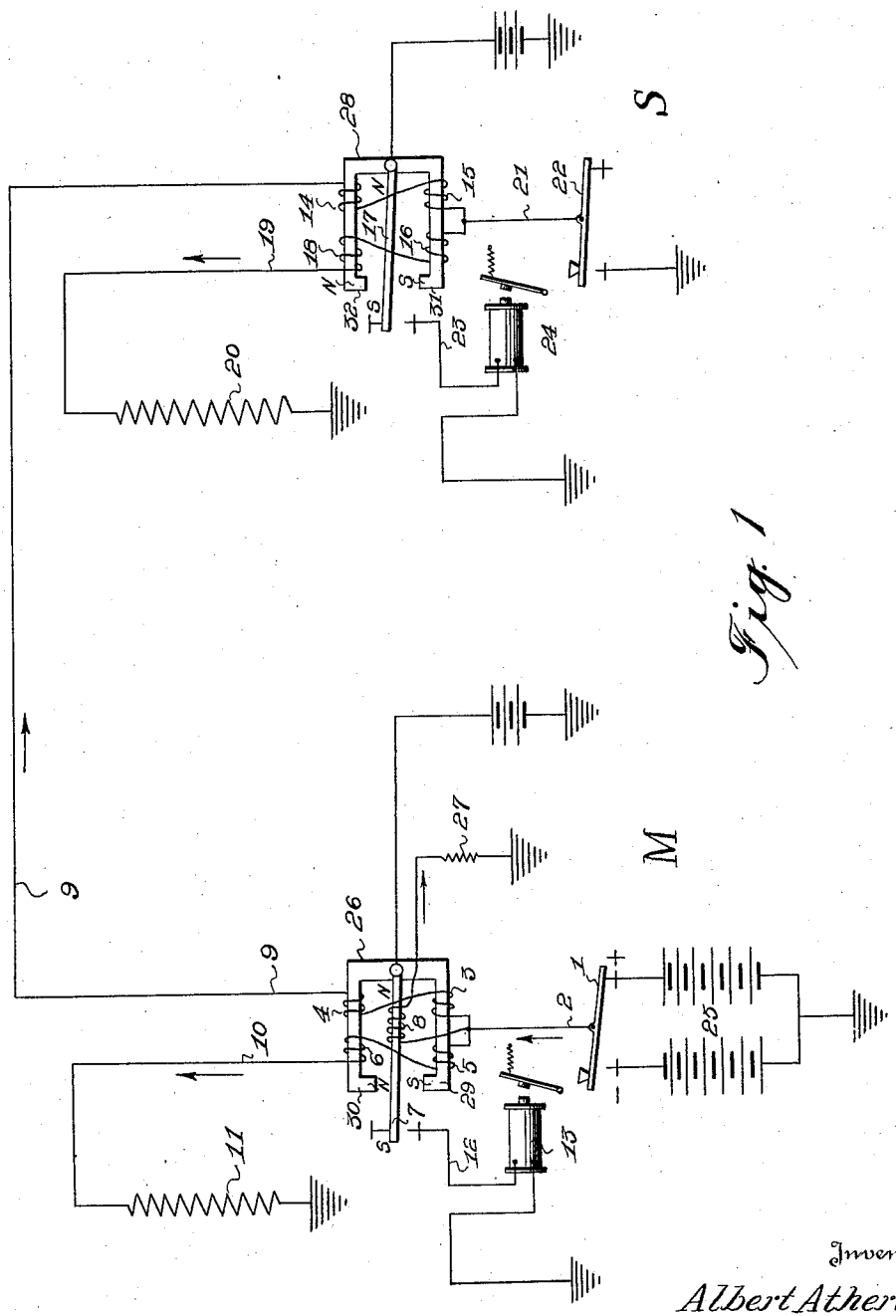
Figs. 1 and 2 are diagrams of the circuits employed, and illustrate the effects produced on the receivers by the operation of the key at the remote substation.

Referring now to Fig. 1, the line 9 is shown connecting the apparatus at the main station M and substation S. A single source of energy 25 is shown at the main station controlled by the key 1.

Figure 2:
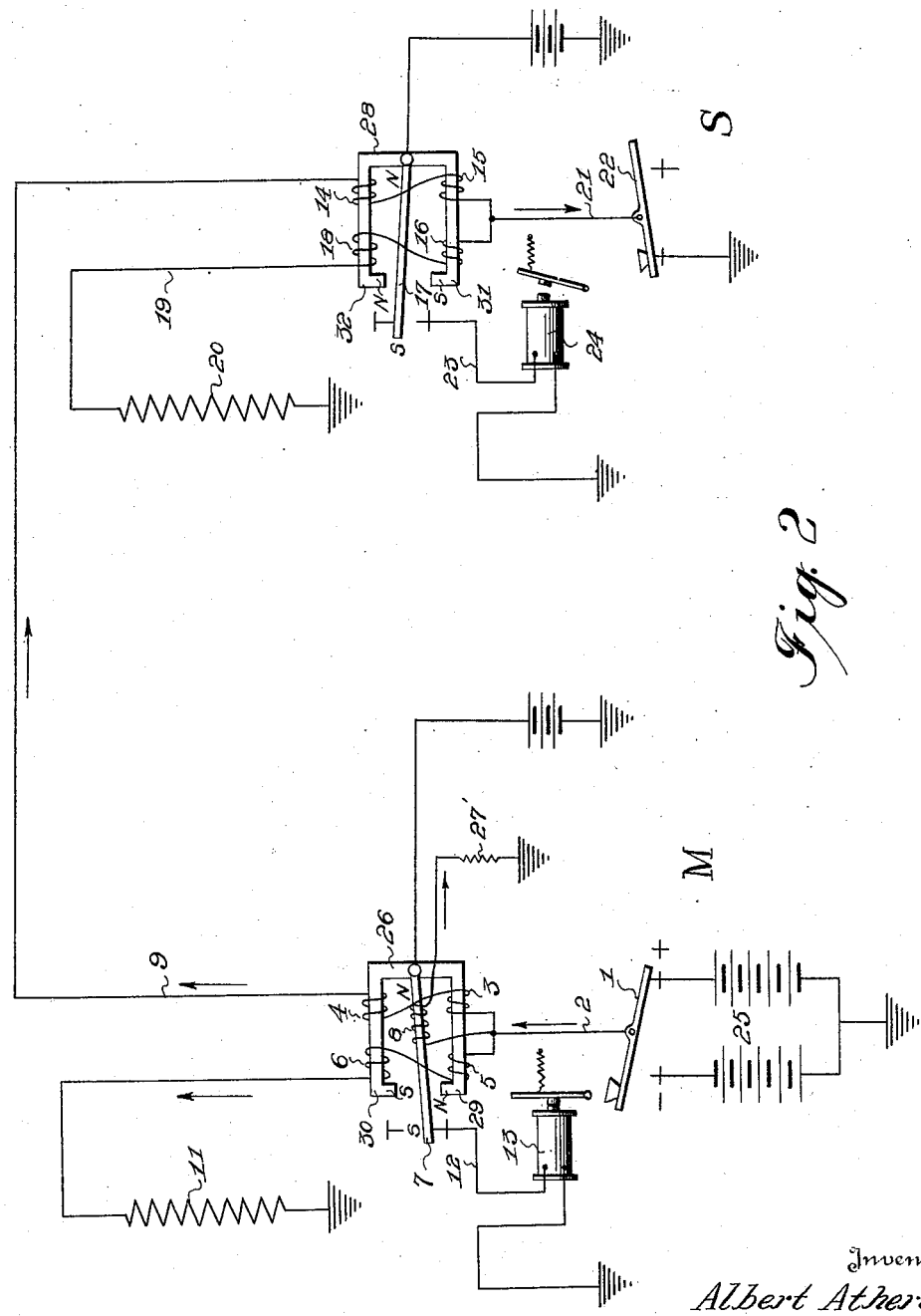

The polar relay 26 comprises, in addition to its windings 3, 4, 5 and 6, a winding 8 which, when carrying current, magnetically polarizes the armature. The ohmic resistance of the artificial line 11 is intermediate that of the line when the key 22 is open, as shown in Fig. 1, and that when the line is closed, as shown in Fig. 2.

At the substation, the polarized relay 28 comprises four windings 14, 15, 16 and 18 and an armature 17. In addition to the key 22 and sounder 24, there is a ground path 20 with an ohmic resistance substantially greater than the main line 9.

With the key at the branch office in open position, as shown in Fig. 1, a circuit is completed from ground through the positive side of battery 25, contact and armature 1, conductor 2, windings 3 and 4 in series, line conductor 9, windings 14, 15, 16 and 18 in series, conductor 19 and ground path 20 to ground. A second circuit is completed at the main station from battery 25, heretofore mentioned, through windings 5 and 6 in series, and artificial line 11 to ground, and a third circuit is completed from battery 25 through winding 8 and resistance 27 to ground.

It should be noted at this time that the windings 3 and 4 are arranged to produce flux which opposes that produced in the windings 5 and 6. The current in windings 3 and 4 produces a flux which passes from pole 29 to pole 30 and around the core back to 29. The current in windings 5 and 6 produces just the opposite effect, tending to make 29 a south pole and 30 a north pole. The current flowing through the winding 8 produces a flux which makes its tip a south pole and the pivot point a north pole.

Since the current in the main line 9 is flowing through the comparatively high resistant ground path 20, the value of this current will be much less than that flowing in line 10 and artificial line 11, the resistance of the latter being, as already stated, of a value intermediate that of the line with the key 22 closed and that with the key open. The current in the windings 5 and 6 being, therefore, much larger than that flowing in 3 and 4, the flux produced by the former is greater with the result that 30 becomes a north pole and 29 a south pole. The armature is therefore, drawn to the position shown, the south pole tip of the armature being attracted to the north pole 30.

At the substation, the windings 14 and 15, of the polarized relay are wound so that the fluxes they produce add to those produced by windings 16 and 18. Since these are now in a series circuit and the current value in them is the same, they produce a flux which makes 31 a south pole and 32 a north pole. The armature 17 is permanently magnetized to make its tip a south pole and its pivot a north pole so that it is attracted to the pole face 32.

When the key 22 is operated to close its contact, the condition disclosed in Fig. 2 is obtained.

The circuit heretofore traced for windings 5 and 6 and artificial line 11 and the circuit for the winding 8 remain the same. The current over the line 9 now flows through windings 14 and 15 at the substation, over conductor 21, key 22 and its closed position to ground. The windings 16 and 18 and ground path 20 are short-circuited by this path, and comparatively no current flows therethrough.

The artificial line 11, it will be recalled was designed to have a lower resistance than the resistance of the line 9 with the key 22 open and a higher resistance when the key is closed. Therefore, the current flow in the windings 3 and 4 will be greater than that in the windings 5 and 6 with a resultant flux which will now make pole face 29 a north pole and 30 a south pole. The direction of flow of current in the winding 8 has not changed and the armature 7 is now attracted to the pole face 29, as shown. An obvious circuit is thereby completed for sounder 13.

Attention is called at this time to the fact that no change in the direction of current has occurred. The operation of the key 22 merely changed the line resistance from greater than that of 19 to less, with an accompanying change of the current in the windings of polar relay 26.

The current flow in windings 14 and 15 being in the same direction as before, the increase in its amount has no effect on the polarity of the pole face and the armature 17 remains in its position attracted by 32 and unaffected by the operation of the key 22.

Referring now to Fig. 3, the effects produced by the operation of the key 1 will now be explained. With the key 22 in open position, as shown in Fig. 1, the armature 7 is attracted to pole face 30 and armature 17 is attracted to pole face 32. Operating key 1 should, of course, have no effect on polar relay 26 while still operating the armature of polarized relay 28. Figs. 1 and 3 are taken for comparison in connection with the effect on relay 26 because the position of key 22 is the same in both these figures and the relay 26 should, therefore, be in the same position. The effect on relay 28 can be noted by comparison of either Fig. 1 or Fig. 2 with Fig. 3.

With the key 1 closing the negative terminal of battery 25, the circuits and current values in them are the same as those in Fig. 1, except that the polarities are reversed. As already pointed out, the currents in windings 5 and 6 are greater than in windings 3 and 4. Since their direction is, however, reversed, 29 will now become a north pole and 30 a south pole. However, the direction of flow of current in winding 8 has also been reversed so that the tip end now is a north pole and is, therefore, attracted to pole face 30. In other words, no effect has been produced on the armature 7 by the reversal of battery polarity.

Attention is called at this time to the circuit arrangement which makes a polar relay unresponsive to polarity reversals. By providing a winding 8 on the armature 7 connected in the same circuit as the remaining windings, reversals in polarity of the line effect both polarity of the pole faces and the armature, thereby producing no change in the position of the armature.

At the substation, however, a change of polarity reverses the flow of flux, making pole face 32 a south pole and pole face 31 a north pole. The permanently magnetized armature 17 is, therefore, attracted to the pole face 31.

An obvious energizing circuit for the sounder 24 is completed over the armature 17 and its contact.

Referring now to Fig. 4, the last possible combination of key positions is shown. The key 1 is shown closing the negative terminal of battery 25 while the key 22 has closed its ground contact. This change should not affect the relay 28 while operating relay 26. Comparing with Fig. 3, this is shown to be the case. The circuits are the same as in Fig. 2, except that the direction of flow of currents has been reversed. As compared with Fig. 2, this change of direction should have no effect on the relay 26 while operating relay 28. This is shown to be so by comparison of Figs. 2 and 4.

The direction of flow of current having been reversed and the current values being the same, the polarity of the pole pieces 29 and 30 is reversed. Since, however, the direction of current flow in winding 8 has been changed, its tip becomes a north pole while the pole face 20 becomes a south pole and is, therefore, attracted thereto.

Comparing with Fig. 3 in this respect, the armature tip is a north pole also, but, since the key 22 is open, the current flow in windings 5 and 6 is greater than in windings 3 and 4 and, therefore, pole face 30 is the south pole.

Returning again to Fig. 4, and considering the substation apparatus in comparison with the similar circuit shown in Fig. 2, the direction of flow of current has been reversed and the polarity of the pole faces, therefore, has been reversed, thereby operating the armature 17 to its lower position.

It will be recalled that mention was made of the fact that with relays heretofore used in such a system as this, signals were lost. This would usually occur when the key at the distant station was operated and was immediately followed by the operation of the key at the main station. If the armature at the main station had started to move responsive to the operation of the remote key, the relay would lose its current during the interval the main station key was moved from contact to contact, and the armature would return to its back contact.

Let it be assumed that this condition took place in the present system. Referring to Fig. 2, let it be assumed that key 22 was moved to open its ground circuit. Immediately, as already explained, armature 7 would move towards pole face 30. However, before reaching its upper position, the key 1 is operated and, for an instant, disconnects battery from the system. This is the condition which results in a false operation in the former system.

In this invention, however, there being no biasing force on the armature 7, it will now continue of its own inertia toward pole face 30. In this way, no signal is lost. Even though the armature did not continue, being unbiased, it would not return to the pole face 29 to again close the now open circuit of sounder 13.

In the foregoing description, I have mentioned specifically the use of grounded main line batteries and return circuits. It is obvious that ungrounded current sources and full metallic return circuits are equally applicable to a system such as that herein described.

Furthermore, it is known that there are other types of polar relays than the one described herein. Such relays are equally applicable to the purpose of my invention and may be similarly adapted thereto by modifying them in the manner herein set forth.

Other means are known by which the armature polarizing coil and the operating coils of the polar relay can be connected to give the polarizing effect described above when actuated by current flowing from the pole-changer contacts.

For the purpose of disclosing my invention I have herein shown one arrangement of circuits but I can make various changes therein while still embodying this invention and hence I am not restricted to the particular arrangement shown but intend to cover all that are embraced within the scope of the following claims.

I claim:

1. In a duplex telegraph system, the combination of a first station, a second station, a duplex signaling line connecting said stations, a polar receiving relay connected to said line at said first station, a single source of energy and circuit arrangements whereby said single source supplies energy for transmitting signals in either direction, said receiving relay being responsive to impulses transmitted thereto from the remote station.

2. In a duplex telegraph system, the combination of a first station, a second station, unbiased receiving relays at each station, circuit arrangements for transmitting impulses in either direction and a single source of energy therefor.

3. In a duplex telegraph system, comprising a first station and a second station, the combination with a line connecting said stations, of artificial lines at each station of resistance different than said line and ranging in value between predetermined limits, and means for simultaneously transmitting impulses in either direction.

4. In a duplex telegraph system, a first station, a second station, a line connecting said stations and artificial lines at each station, each of said artificial lines having different resistances ranging in value between predetermined limits, and circuit arrangements for simultaneously transmitting impulses over said line.

5. In a telegraph system, a first station, a second station, a line connecting said stations, means for transmitting impulses of varying intensity over said line, a polar relay at said first station, and circuit arrangements for rendering said polar relay responsive to the variations of intensity of said impulses.

6. In a telegraph system, a first station, a second station, a line connecting said stations, means for transmitting impulses of reversed polarity over said lines, means for transmitting impulses of varying strength over said line, a polar relay at said first station, and circuit arrangements whereby said relay is unresponsive to said polarity reversals and is responsive to said impulses of varying strength.

7. In a telegraph system, a first station, a second station, a line connecting said stations, unbiased receiving relays at said stations, means for transmitting impulses of varying polarity over said line, means for simultaneously transmitting impulses of varying strength over said line, one of said receiving relays being responsive only to changes in strength and another of said relays being responsive only to changes in polarity.

8. In a telegraph system, a first station, a second station, a polar relay at said first station, a polarized relay at said second station, means for transmitting impulses of reversed polarity, means for transmitting impulses of varying strength, and circuit arrangements whereby said polar relay responds only to impulses of varying strength and said polarized relay responds only to impulses of varying polarity.

9. The combination of a circuit and a polar relay, comprising an armature and a winding which, when carrying current, polarizes said armature, said circuit being so connected to said winding as to render said relay unresponsive to reversals of polarity.

10. The combination of a circuit and a polar relay, said circuit being so connected to the windings of said polar relay as to reverse the direction of flow of current in said windings, said polar relay being unresponsive thereto.

11. In a polar relay, a core comprising a plurality of sections, a winding on each section, an armature and a winding thereon connected to the midpoint of one of said core windings.

12. The method of operating a duplex telegraph system which comprises transmitting signals composed of impulses of reversed polarity in one direction over the duplex system and signals composed of impulses of varying intensity in the opposite direction.

13. In a duplex telegraph system, a signalling line, a polar receiving relay connected to said line comprising a plurality of windings, a battery connection intermediate said windings, an armature, a winding on said armature connected to said battery, and means including circuit connections whereby said relay is nonresponsive to current flowing through said windings from said battery irrespective of changes in resistance of said line.

14. In a duplex telegraph system, a signalling line, a polar relay connected to each end of said signalling line, each of said polar relays comprising a plurality of windings connected in series with said signalling line, a comparatively high resistance connected in series with one of said relays opposite said line, said resistance being grounded and a resistance of smaller value connected in series with said other relay opposite said line, said resistance being also grounded.

15. In a duplex telegraph system, a signalling line, a polar relay connected thereto at each end of said signalling line, each of said polar relays comprising a plurality of windings connected in series with said signalling line, a comparatively high resistance connected in series with one of said relays opposite said line, said resistance being grounded, a resistance of smaller value connected in series with said other relay opposite said line, said resistance being also grounded, a battery connected intermediate the windings of said second mentioned relay and a ground connection intermediate the windings of said first mentioned relay.

16. In a duplex telegraph system, a signalling line, a polar relay connected thereto at each end of said signalling line, each of said polar relays comprising a plurality of windings connected in series with said signalling line, a comparatively high resistance connected in series with one of said relays opposite said line, said resistance being grounded, a resistance of smaller value connected in series with said other relay opposite said line, said resistance also being grounded, a battery connected intermediate the windings of said second mentioned relay and a ground connection intermediate the windings of said first mentioned relay and an armature winding on said second mentioned relay, said armature winding being connected to said battery.

17. In a duplex telegraph system, a signalling line, a polar relay connected to each end of said signalling line, a ground return circuit therefor and means including circuit connections for transmitting impulses from either end to the opposite end simultaneously, the receiver at each end being non-responsive to impulses transmitted therefrom and means including circuit connections whereby said duplex operation is independent of changes in the line resistance of said signalling line.

18. In a duplex telegraph system, a signalling line, a balancing means at each end of said signalling line, receiving and transmitting apparatus at each end of said signalling line, said apparatus operating to transmit and receive signals over said signalling line simultaneously in each direction without interference for varying values of said balancing means between predetermined limits.

19. In combination, a polar relay having a core, a winding on said core, an armature, a winding on said armature, and means including circuit connections for varying the polarity of current flow through said windings said circuit connections being such that said polar relay is non-responsive to said variations of polarity through the windings.

20. In a polar relay comprising a plurality of cores, a plurality of windings on each core, an armature, a winding on said armature and a battery connection to the midpoint of the windings on one of said cores, said armature winding being connected to the same terminal of said battery.

21. In a polar relay comprising a plurality of cores, a plurality of windings on each core connected in series, an armature, a winding on said armature, a battery connection to the midpoint of the winding on one of said cores, said armature being connected to the same terminal of said battery and a resistance connected in series with said plurality of windings, said windings being connected in series and a line connected in series with said winding.

22. In a duplex telegraph system, a signalling line, a polar receiving relay connected to said line comprising a plurality of windings, a battery connection intermediate said windings, and means including circuit connections whereby said relay is non-responsive to current flowing through said windings from said battery irrespective of changes in resistance of said line.

In testimony whereof I affix my signature
ALBERT ATHERTON.